United States Patent [19]

Chen et al.

[11] Patent Number: 5,756,601
[45] Date of Patent: May 26, 1998

[54] PROCESS FOR THE PREPARATION OF N-ALKYLATED OR N-ALKOXYALKYLATED POLYANILINES SOLUBLE IN ORGANIC SOLVENTS HAVING LOW BOILING POINTS

[75] Inventors: Show An Chen, Hsin Tsu; Gue Wuu Hwang, Kaohsiung; Jyh Shyong Lin, Hua Lien; Kuan Ying Wu, Yun Lin, all of Taiwan

[73] Assignee: National Science Council, Taiwan

[21] Appl. No.: 787,329

[22] Filed: Jan. 28, 1997

[51] Int. Cl.$^6$ .................................................. C08G 73/00
[52] U.S. Cl. ............................................ 525/540; 528/424
[58] Field of Search ............................ 525/540; 528/424

[56] References Cited

U.S. PATENT DOCUMENTS

| | | | |
|---|---|---|---|
| 5,100,977 | 3/1992 | Oka | 525/540 |
| 5,237,023 | 8/1993 | Oka . | |
| 5,250,639 | 10/1993 | Oka . | |
| 5,254,670 | 10/1993 | Oka | 528/373 |
| 5,264,552 | 11/1993 | Abe et al. | 528/422 |
| 5,304,613 | 4/1994 | Oka . | |

OTHER PUBLICATIONS

W. Zheng et al., "Characterization and Solid–State Properties of Processable N–Alkylated Polyanilines in the Neutral State", Macromolecules, 27(26):7754–7768 (1994).

Zheng, et al., Macromolecules, 27, 1994, pp. 7754–7765.

*Primary Examiner*—Melvin I. Marquis
*Assistant Examiner*—D. Aylward
*Attorney, Agent, or Firm*—Finnegan, Henderson, Farabow, Garrett & Dunner, L.L.P.

[57] ABSTRACT

A process for preparing an N-substituted polyaniline comprising the steps of reacting an alkali hydride and a polyaniline having imine bonds, mixing the reaction mixture with an alkyl or alkoxyalkyl halide to generate a polymer, precipitating the generated polymer, and undoping the polymer. The N-substituted polyaniline can be dissolved in organic solvents having low boiling points and can be doped to provide films with a conductivity of $10^{-6}$ to $10^{-2}$ s/cm.

12 Claims, 5 Drawing Sheets

IR spectra of
(a) polyaniline
(b) N-hexylated polyaniline
(c) N-octylated polyaniline
(d) N-decylated polyaniline
(e) N-dodecylated polyaniline
(f) N-hexadecylated polyaniline GPC OF N-dodecylated polyaniline
(solvent : CHCl$_3$; flow rate: 0.5 ml/min)

UV-vis spectra of
(a) N-hexadecylated polyaniline
(b) N-hexadecylated polyaniline doped with p-dodecylbenzenesulfonic acid UV-vis spectra of
(a) N-EOM PAn in $CHCl_3$
(b) N-EOM PAn doped with camphor sulfonic acid in $CHCl_3$

PROCESS FOR THE PREPARATION OF N-ALKYLATED OR N-ALKOXYALKYLATED POLYANILINES SOLUBLE IN ORGANIC SOLVENTS HAVING LOW BOILING POINTS

BACKGROUND OF INVENTION

The present invention relates to a process for preparing polyaniline derivatives, especially N-alkylated or N-alkoxyalkylated polyanilines. The polyaniline derivatives prepared by the process of the present invention can be dissolved in organic solvents having low boiling points and can be doped to provide films with a conductivity of $10^{-6}$ to $10^{-2}$ s/cm.

Polyanilines are low in cost and stable in air and thus are widely used in industrial productions. The conductivity of polyanilines can be enhanced to the extent of $10^{-3}$ to $10^{-5}$ s/cm by oxidizing and doping the polyanilines to meet the conductivity requirements of electromagnetic interference shielding (EMI shielding, $10^{-3}$ s/cm), electrostatic-discharge (ESD, $10^{-5}$ s/cm) and antistatic materials ($10^{-9}$ s/cm).

However, for practical applications, conductivity is not the only requirement. In many conditions, mechanical properties and the adhesion to substrates are also important. Generally, it is desired to impart polyaniline products the required mechanical properties and adhesion by blending polyaniline with other polymers. Hence, it is desired to prepare polyaniline derivatives which are soluble in organic solvents having low boiling points to facilitate the blending.

Known processes for preparing polyaniline derivatives soluble in organic solvents are disclosed in "Characterization and Solid-State Properties of Processable N-Alkylated Polyanilines in the Neutral State," Macromolecules, vol. 27, pp.7754–7768 (1994), Levon, et. al., and U.S. Pat. Nos. 5,100,977, 5,237,023, 5,254,670, 5,250,639 and 5,304,613. All the processes require a first reduction of the imine bonds (=N—) on polyaniline to amine bonds (—N—) and then a substitution reaction to provide N-substituted polyanilines. In other words, all processes for the preparation of N-substituted polyanilines known in the art require a step of reducing the imine bonds on polyaniline to amine bonds.

The present invention provides a solution to help polyaniline derivatives in meeting the aforementioned requirement.

Accordingly, it is an object of the present invention to provide a process for preparing N-substituted polyanilines soluble in organic solvents having low boiling points. Specifically, the process in accordance with the present invention does not comprise any reducing steps and can provide polyaniline derivatives in an easier way to meet the requirements for industrial production.

It is another object of the present invention is also to provide polyaniline derivatives with good conductivity, solubility and mechanical properties and suitable for use as EMI shielding, ESD, and antistatic materials.

The present invention is also to provide composite films with good conductivity, good mechanical properties and a well adhesion to substrates.

SUMMARY OF THE INVENTION

It has now been found that an N-alkylated or N-alkoxyalkylated polyaniline can be prepared by a process comprising steps of reacting a polyaniline and an alkali hydride, mixing the reaction mixture with an alkyl or alkoxyalkyl halide to generate a polymer, precipitating the polymer, and undoping the precipitated polymer.

The N-alkylated or N-alkoxyalkylated polyanilines prepared by the process of the present invention are soluble in organic solvents having low boiling points and can be doped to provide the conductivity meeting the requirements for industrial applications.

These and other objects, advantages and features of the present invention will be more fully understood and appreciated by reference to the written specification and appended drawings.

BRIEF DESCRIPTION OF THE DRAWINGS

The present invention will be further explained with reference to the annexed drawings, wherein.

DETAILED DESCRIPTION OF THE INVENTION

Figure 1:
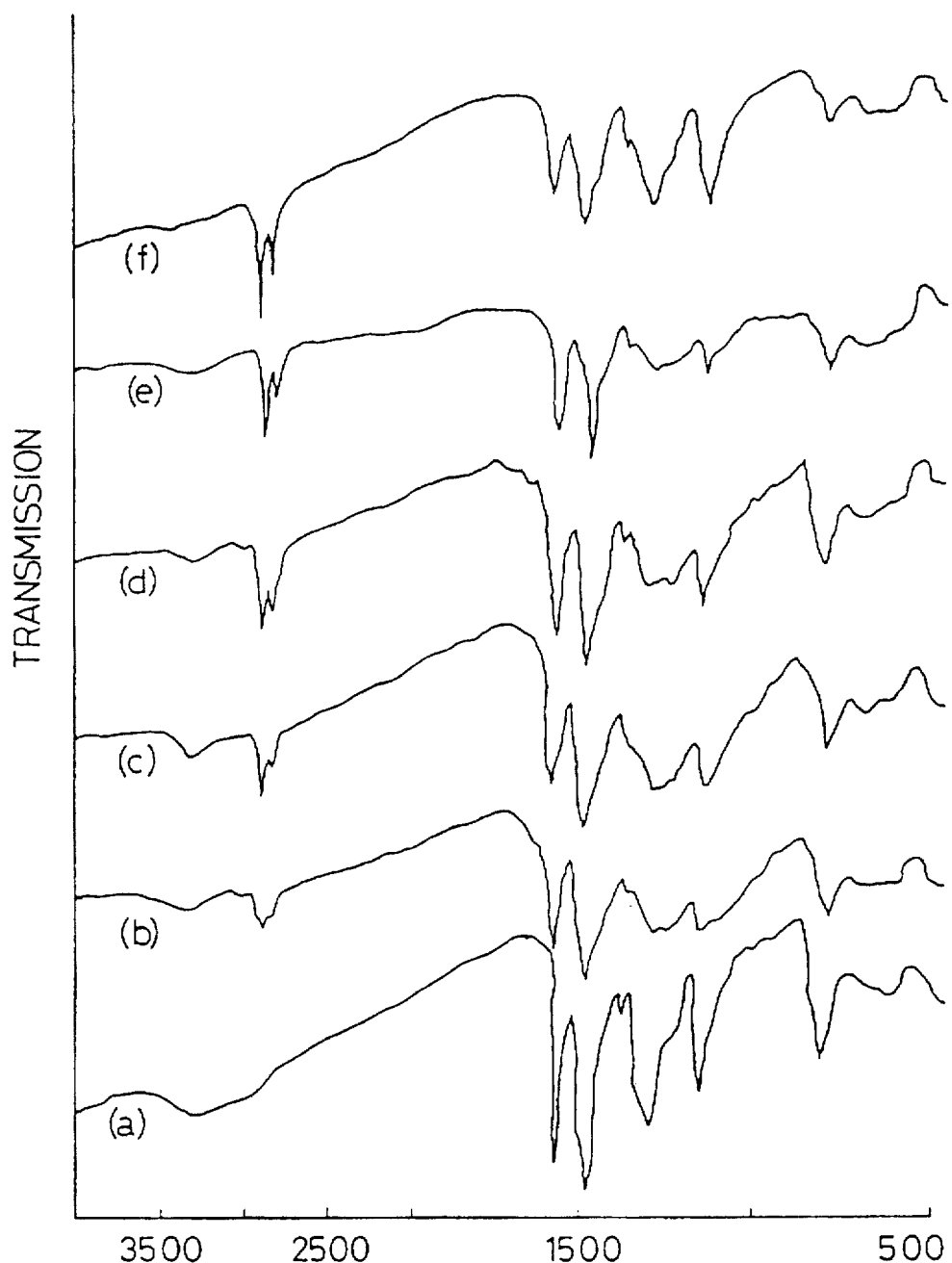
FIG. 1 is IR spectra of the polyaniline of Example 1 and N-alkylated polyanilines of Example 2.

While this specification concludes with claims particularly pointing out and distinctly claiming that which is considered to be the invention, it is believed that the invention can be better understood from a reading of the following detailed description of the invention.

For the subject invention, the term "N-alkylated polyanilines" refers to polyanilines wherein at least parts of the nitrogen atoms of the polyanilines have at least one alkyl substituent and the term "N-alkoxyalkylated polyanilines" refers to polyanilines wherein at least parts of the nitrogen atoms of the polyanilines have at least one alkoxyalkyl substituent. Also, the term "N-substituted polyanilines" refers to the N-alkylated or N-alkoxyalkylated polyanilines.

The present invention provides a process for preparing polyaniline derivatives soluble in organic solvents having low boiling points. The process of the present invention comprises directly reacting an alkyl or alkoxyalkyl halide with a polyaniline having imine bonds to prepare a high molecular weight polyaniline derivative which is soluble organic solvents having low boiling points and the polyaniline derivative still contains imine bonds. The polyaniline derivatives prepared by the process of the present invention can be doped to provide a conductivity of the range from $10^{-2}$ to $10^{-6}$ s/cm and can be dissolved in organic solvents and blended with other polymers so as to provide articles with desired properties.

Specifically, the process of the present invention comprises steps of reacting an alkali hydride with a polyaniline having imine bonds, mixing the reaction mixture and an alkyl or alkoxyalkyl halide to generate a polymer, precipitating the polymer, and undoping the precipitated polymer.

The reaction of an alkali hydride and a polyaniline having imine bonds can be carried out in a solvent which can dissolve the polyaniline. Preferably, the polyaniline is added to the solvent followed by the addition of the alkali hydride to react with the polyaniline to obtain a polyaniline having anionic nitrogen atoms. The solvent may be any chemicals which can dissolve the polyaniline. For instance, the solvent can be, but not limited to, dimethyl sulfoxide (DMSO), N-methyl-2-pyrrolidinone (NMP) or N,N-dimethyl formamide (DMF). In a preferred embodiment, the alkali hydride is potassium hydride, sodium hydride, lithium hydride or a combination thereof. The more preferred alkali hydride is sodium hydride. For instance, the reaction can be carried out by dissolving the polyaniline in DMSO and then adding sodium hydride to the DMSO solution to produce anionic nitrogen atoms on the polyaniline.

Thereafter, the reaction mixture comprising polyaniline having anionic nitrogen atoms is mixed with an alkyl or alkoxyalkyl halide to proceed the alkylation or alkoxyalkylation of the anionic nitrogen atoms on polyaniline and obtain N-alkylated or N-alkoxyalkylated polyanilines. The amount of the halide used can be more than or equal to the amount of nitrogen atoms of the polyaniline. Preferably, the amount of the halide used is more than the amount of nitrogen atoms. The halide can be a fluoride, a chloride, a bromide or an iodide. Preferably, the halide used is a bromide or a chloride. The alkyl on the halide can be $C_{1-24}$alkyl, preferably $C_{1-20}$alkyl and more preferably $C_{1-16}$alkyl. The alkoxyalkyl on the halide can be $C_{1-10}$alkoxy$C_{1-20}$alkyl, preferably $C_{1-6}$alkoxy$C_{1-10}$alkyl and more preferably $C_{1-4}$alkoxy$C_{1-6}$alkyl. This mixing step can be carried out at any suitable temperature. It is preferred that the mixing step is carried out at a temperature of from 10° C. to 100° C., from 20° C. to 50° C. is especially preferred.

Thus N-substituted polyanilines are separated from the reaction mixture by precipitation. The precipitation is carried out by mixing the reaction mixture and a protic acid aqueous solution. Suitable protic acids can be, but not limit to, HCl, HClO$_4$, HBF$_4$, H$_2$SO$_4$ or the mixtures thereof.

Because the precipitated N-substituted polyanilines are doped with the protic acid, the precipitated N-substituted polyanilines are thereafter undoped with a base. The base can be ammonia vapor or a basic solution. The N-substituted polyanilines can be directly added to a basic solution or be exposed to ammonia vapor. Preferably, the polyanilines are washed by deionized water prior to being undoped with a base. The basic solution can be an aqueous ammonia solution or an aqueous solution of alkali hydride. The alkali hydride can be lithium hydride, sodium hydride, potassium hydride or the mixture thereof.

The "polyaniline" for use in the process of the present invention is a polymer having the following repeating unit:

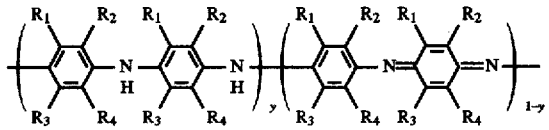

wherein 0<y<1, $R_1$, $R_2$, $R_3$, $R_4$ can be the same or different and independently are H, $C_{1-4}$alkyl, $QR^7$, halogen, $NO_2$ or CN, wherein Q is —O—, —S—, —CO—, —OC—, —NHC or —CO—, the halogen is F, Cl, Br or I and $R^7$ is $C_{1-8}$alkyl, aryl or alkylaryl.

Accordingly, the N-substituted polyaniline prepared by the process of the present invention is a polymer having the following repeating unit:

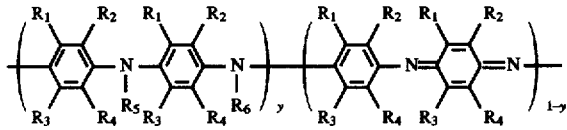

wherein y, $R_1$, $R_2$, $R_3$ and $R_4$ are with the same meanings as previously defined. $R_5$ and $R_6$ are independently H, $C_{1-24}$alkyl or $C_{1-10}$alkoxy$C_{1-20}$alkyl with the proviso that at least one of $R_5$ and $R_6$ is not H and from 10% to 80% of the repeating units have both $R_5$ and $R_6$ as H. The N-substituted polyanilines prepared by the present invention can be dissolved in common low-boiling point organics and thus can facilitate the processing of the N-substituted polyanilines. The low-boiling point organics can be, but not limit to, CH$_2$Cl$_2$, CHCl$_3$ or tetrahydrofuran (THF).

The N-substituted polyanilines prepared by the process of the present invention can be doped with any suitable dopants to enhance their conductivity because they still retain the imine bonds. The conductivity of the doped N-substituted polyanilines can be up to $10^{-2}$ s/cm and in the range of from $10^{-2}$ to $10^{-5}$ s/cm. Any dopants known for doping conductive polymers can be used in the present invention. Preferably, the dopant is selected from the group consisting of halides such as chlorine, bromine, iodine and iodine trichloride; inorganic acids such as sulfuric acid, hydrochloric acid, nitric acid, perchloric acid, and hydrofluoroboric acid or the salts of the acids; Lewis acids such as aluminum trichloride, iron trichloride, molybdenum chloride, antimony chloride, and arsenic pentafluoride; or organic acids such as acetic acid, trifluoroacetic acid, benzenesulfonic acid, and p-toluenesulfonic acid.

The doped conductive N-substituted polyanilines can be further blended with other polymers to enhance the mechanical properties of products prepared therefrom or improve the adhesion of the films prepared therefrom to substrates. The polymer used for blending with the N-substituted polyanilines can be a polymer or copolymer of, but not limit to, styrene, methacryate, acrylate, vinyl ester, vinyl chloride, alkane, carbonate, ester or siloxane.

The following examples are offered by way of illustration. The examples are not intended to be limiting to the scope of the invention in any respect and should not be so construed.

EXAMPLES

EXAMPLE 1

The preparation of N-unsubstituted Polyaniline

N-unsubstituted polyaniline was prepared in accordance with the process disclosed in Synth. Met., 13(1986) pp. 193–205. 9.3 Ml aniline monomer was added to a 200 ml 1M HCl aqueous solution and 34.23 g oxidant (NH$_4$)$_2$S$_2$O$_8$ was added to another 200 ml 1M HCl aqueous solution. Under N$_2$ atmosphere and in ice bath, the oxidant solution was added dropwise into the monomer solution with stirring to form polyaniline precipitate. After 9 hours, the polyaniline precipitate was filtered and washed with an excess amount of 1M HCl solution and deionized water until converted colorless. The polyaniline was undoped by being put into a 200 ml aqueous solution of 1M NH$_4$OH with stirring. After 24 hours, the solution was filtered and the residue was washed with an excess amount of deionized water until the filtrate is neutral. The product was then dried in vacuo for at least 48 hours to obtain undoped polyaniline powder. 50% Nitrogen atoms of the polyaniline is in imide bonds.

EXAMPLE 2

The preparation of N-substituted Polyaniline 1.81 g dried polyaniline of Example 1 was dissolved in 100 ml purified dry dimethyl sulfoxide. Under N$_2$ atmosphere, 0.36 g NaH was added to the dimethyl sulfoxide solution and the reaction was carried out at 40°–50° C.

for 6 hours. 1-Bromohexane was added to the reaction solution at ambient temperature and the reaction was carried out for 12 hours. The reaction solution was then poured into a 500 ml 1M HCl solution and precipitates developed. The precipitates were washed with an excess amount of deionized water and then dispersed in deionized water. An aqueous solution of sodium hydroxide was added into the precipitate solution to undope the precipitates for 24 hours. The solution was filtrated and the residue was washed with a large amount of deionized water and dried in vacuo for at least 48 hours. The product was washed with n-hexane and filtrated and the residue was dried in vacuo for at least 24 hours to obtain N-hexylated polyaniline.

The above procedures were repeated with the exception that 1-bromohexane was replaced by 1-bromooctane, 1-bromodecane, 1-bromododecane and 1-bromohexadecane so as to obtain N-octylated polyaniline, N-decylated polyaniline, N-dodecylated polyaniline and N-hexadecylated polyaniline respectively.

FIG. 1 is the IR spectrum of these polyaniline derivatives. It is noted from the absorption strength of 1589 cm$^{-1}$ (N=quinoid=N vibration)/1498 cm$^{-1}$ (C=C vibration) that 40%–50% repeating units of these polyaniline derivatives remain in the oxidized quinoid forms. Further, the absorption pattern at 829 cm$^{-1}$ (C—H out-of-plane bending of the 1,4-disubstituted benzene ring) indicates that the benzene rings of these polyaniline derivatives still remain 1,4-substitution and no addition reaction happens on the rings. Moreover, the absorption patterns at 1252 cm$^{-1}$ (stretch of $C_{aliphatic}$—N), 2922 cm$^{-1}$ and 2582 cm$^{-1}$ (stretch of C—H) indicate that the alkyl groups attach to the amine nitrogen atoms of the polyaniline.

Table I shows the data of the $^1$H-NMR (300 MHz, CDCl$_3$) spectrum of N-octylated polyaniline.

TABLE I

|  | position of H |
|---|---|
| 0.8 ppm | —(CH$_3$) |
| 1.1–1.3 ppm | —(CH$_2$)$_3$—CH$_3$ |
| 3.6 ppm | N—H and N—CH$_2$ |
| 1.65 ppm | N—CH$_2$—CH$_2$ |
| 6.8–7 ppm | and |

The above IR and NMR spectra reveal that the N-alkylated polyanilines have the following repeating units:

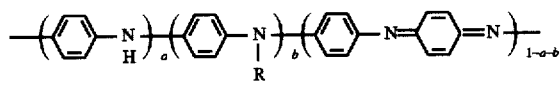

Table II shows the elementary analysis of the N-hexylated polyaniline, N-decylated polyaniline, N-dodecylated polyaniline and N-hexadecylated polyaniline.

TABLE II

| substituent | element composition | | | alkylation | quinoid |
|---|---|---|---|---|---|
| on N | N | C | H | % | % |
| hydrogen | — | — | — | — | 4.8$^a$ |
| hexyl | 11.07 | 79.28 | 7.92 | 39.33 | 46.62 |
| octyl | 9.62 | 80.62 | 8.57 | 37.81 | 50.25 |

TABLE II-continued

| substituent | element composition | | | alkylation | quinoid |
|---|---|---|---|---|---|
| on N | N | C | H | % | % |
| dodecyl | 8.71 | 79.74 | 8.66 | 39.03 | 43.82 |
| hexadecyl | 7.97 | 80.31 | 8.95 | 36.01 | 41.93 | a: the result obtained from ESCA

As shown in Table II, from the mole ratio of C/N, there are about 36%–39% alkyl groups attaching to nitrogen atoms. In other words, the alkylation extent is about 36%–39%.

EXAMPLE 3

This example illustrates the solubility of N-substituted polyanilines of the present invention in different solvents. Each of the polyaniline of Example 1 and the polyaniline derivatives of Example 2 is dissolved in different solvents to determine its solubility. The results are shown in Table III.

TABLE III

| | Solubility of N-alkylated polyanilines in various solvents | | | | |
|---|---|---|---|---|---|
| substituent | solvent | | | | |
| on N | THF | CHCl$_3$ | CH$_2$Cl$_2$ | NMP | DMSO |
| hydrogen | + | + | − | ++ | ++ |
| butyl | + | + | + | + | + |
| hexyl | ++ | ++ | ++ | + | − |
| octyl | ++ | ++ | ++ | − | − |
| decyl | ++ | ++ | ++ | − | − |
| dodecyl | ++ | ++ | ++ | − | − |
| hexadecyl | ++ | ++ | ++ | − | − | a: ++ excellent; + good; — poor

Figure 2:
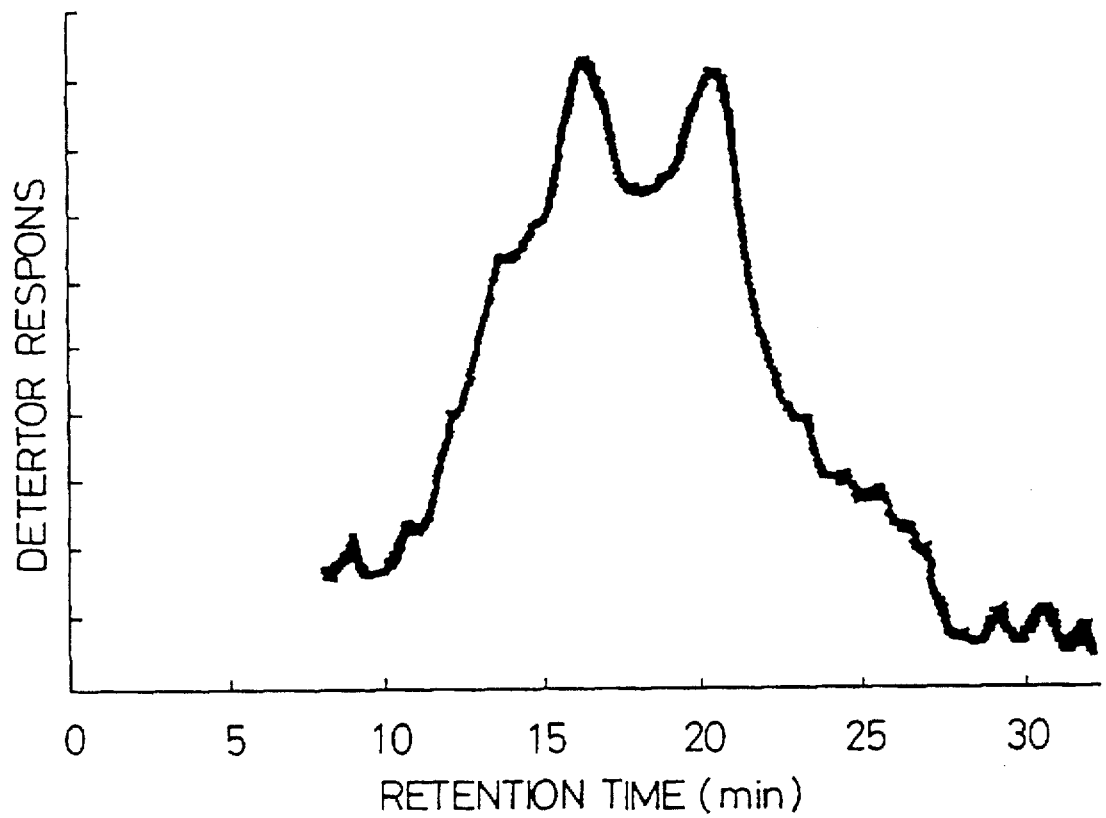
FIG. 2 is gel permeation chromatography of the N-dodecylated polyaniline of Example 2.

As shown in Table III, the solubility of the N-alkylated polyanilines of the present invention in organic solvents having low boiling points is superior to that of N-unsubstituted polyaniline. FIG. 2 is the GPC analysis result of the chloroform solution of N-dodecylated polyaniline. As shown in FIG. 2, N-dodecylated polyaniline has a bimodal molecular weight distribution, one peak at 1.2×10$^5$ and the other at 8×10$^3$. The number average molecular weight of the N-dodecylated polyaniline is 4.9×10$^4$ and the weight average molecular weight is 7.7×10$^5$ relative to polystyrene standard polymer.

EXAMPLE 4

The polyaniline of Example 1 and polyaniline derivatives of Example 2 were dissolved in 1M HCl aqueous solution or first dissolved in CH$_2$Cl$_2$ and then mixed with p-dodecylbenzenesulfonic acid. The amount of p-dodecylbenzenesulfonic acid was that the molar ratio of p-dodecylbenzenesulfonic acid to aniline monomers used in the preparation of polyaniline (polyaniline derivatives) was 1:1. Each of the doped polymer was casted or coated on a substrate to form a film. The conductivity of the film was tested by a four-probe method. As shown in Table IV, the conductivity of the films of the polyaniline derivatives is in the range of from 7.6×10$^{-3}$ to 6.8×10$^{-4}$ s/cm.

TABLE IV

The conductivity (s/cm) of N-alkylated polyanilines at ambient temperature

| substituent on N | undoped | doped with HCl | doped with p-dodecyl-benzene-sulfonic acid |
|---|---|---|---|
| hydrogen | $6.8 \times 10^{-9}$ | 2.6 | — |
| hexyl | $2.1 \times 10^{-9}$ | $2.6 \times 10^{-2}$ | $7.6 \times 10^{-3}$ |
| octyl | — | $6.2 \times 10^{-3}$ | $4.1 \times 10^{-3}$ |
| decyl | — | $3.8 \times 10^{-3}$ | $1.6 \times 10^{-3}$ |
| dodecyl | — | $9.6 \times 10^{-4}$ | $8.9 \times 10^{-4}$ |
| hexadecyl | — | $6.5 \times 10^{-4}$ | $6.8 \times 10^{-4}$ |

Figure 3:
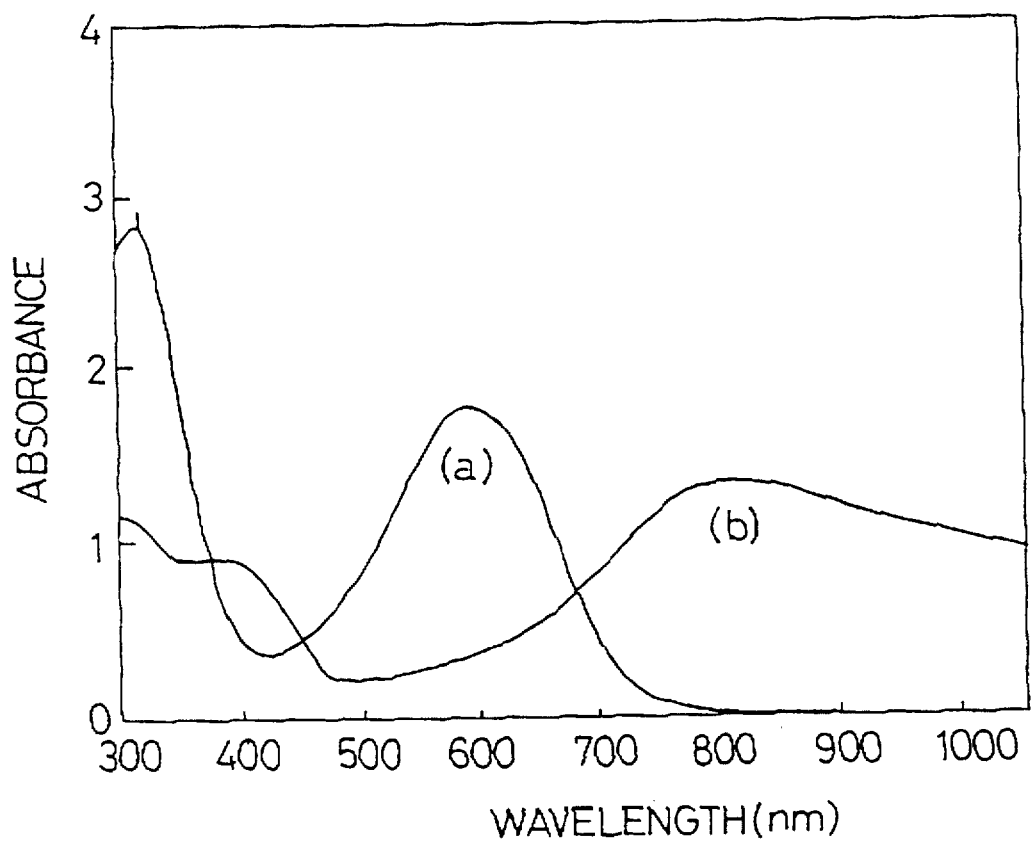
FIG. 3 is UV-visible spectra of the N-hexadecylated polyaniline of Example 2 under various conditions.

FIG. 3 shows the UV-visible spectra of N-hexadecylated polyaniline before and after being doped with p-dodecylbenzenesulfonic acid. The absorption pattern at 330 micrometer corresponds to the π-π* transition (J. Am. Chem. Soc., 108 (1986) 8311) and the absorption pattern at 600 micrometer corresponds the exciton transition of quinoid rings (Phys. Rev. Lett., 59 (1987) 1464). As compared with FIG. 3(a), it was noted that, in FIG. 3(b), the absorption patterns at 420 micrometer and 860 micrometer corresponding to the polaron/bipolaron band transition (referring to Phys. Rev. Lett., 59 (1987) 1464) appear and the absorption pattern at 603 micrometer disappears. The comparison between FIGS. 3(a) and 3(b) shows that the polyaniline is doped.

EXAMPLE 5

The influence of the amount of acid used for doping on the conductivity of N-alkylated polyanilines The N-hexadecylated polyaniline of Example 2 was dissolved in $CH_2Cl_2$ followed by the addition of various amounts of p-dodecylbenzenesulfonic acid or camphor sulfonic acid. The doped N-hexadecylated polyanilines were separately casted to or coated on a substrate to form a film. The conductivity of the films prepared at different acid levels was tested by a four-probe method and a two-disk method. The results were shown below in Tables V and VI.

TABLE V

The conductivity of (s/cm) N-hexadecylated polyaniline doped with different amounts of p-dodecylbenzenesulfonic acid at ambient temperature

| ratio of PAnN-16/acid | four-probe mehtod | two-disk method |
|---|---|---|
| 1/0.2 | $2.1 \times 10^{-6}$ | $8.9 \times 10^{-9}$ |
| 1/0.4 | $8.6 \times 10^{-5}$ | $9.6 \times 10^{-8}$ |
| 1/0.5 | $3 \times 10^{-4}$ | $7.6 \times 10^{-7}$ |
| 1/0.7 | $7.2 \times 10^{-3}$ | $1.2 \times 10^{-5}$ |
| 1/0.8 | $6.9 \times 10^{-4}$ | $3.4 \times 10^{-6}$ |
| 1/1 | $6.5 \times 10^{-4}$ | $6.8 \times 10^{-7}$ |

PAnN-16: N-hexadecylated polyaniline
acid: p-dodecylbenzenesulfonic acid

TABLE VI

The conductivity (s/cm) of N-hexadecylated polyaniline doped with different amounts of camphor sulfonic acid at ambient temperature

| ratio of PAnN-16/acid | four-probe mehtod | two-disk method |
|---|---|---|
| 1/0.2 | $8.4 \times 10^{-6}$ | $7.6 \times 10^{-8}$ |
| 1/0.4 | $4.4 \times 10^{-4}$ | $6 \times 10^{-8}$ |
| 1/0.5 | $8.9 \times 10^{-3}$ | $1 \times 10^{-8}$ |
| 1/0.7 | $6.1 \times 10^{-2}$ | $4.2 \times 10^{-5}$ |
| 1/0.8 | $7 \times 10^{-3}$ | $2.3 \times 10^{-6}$ |
| 1/1 | $1.4 \times 10^{-3}$ | $2.5 \times 10^{-6}$ | acid: camphor sulfonic acid

EXAMPLE 6

The preparation of N-alkoxyalkylated polyanilines 2.26 Unsubstituted polyaniline of Example 1 was dissolved in 200 ml purified dry dimethyl sulfoxide and 0.9 g NaH was added to the solution under $N_2$ atmosphere and at 40°-50° C. to react for 4 hours. 2-Methoxyethyl chloride was then added to the solution at ambient temperature to react for further 12 hours. The reaction solution was then added to a 500 ml aqueous solution of 1M HCl and precipitates developed. The precipitates were washed by an excess amount of deionized water and then dispersed in deionized water. A suitable amount of $NH_4OH$ was added to the precipitate solution for 24 hours to undope the precipitates. The solution was filtered and the residue was washed by an excess amount of deionized water and then dried in vacuo for at least 48 hours. The dried product was washed by acetone twice and filtered and the residue was dried in vacuo for at least 24 hours to obtain N-methoxyethylated polyaniline (N-EOM PAn).

In the IR spectrum of N-EOM PAn, it is noted that the absorption strength of 1593 $cm^{-1}$/1497 $cm^{-1}$ maintains the same. In other words, the oxidation state of N-EOM PAn remains at about 0.5. Further, the absorption pattern at 827 $cm^{-1}$ (C—H out-of-plane bending of the 1,4-disubstituted benzene ring) shows that benzene rings of N-EOM PAn remains 1,4-substitution and no addition reaction happens on the rings. Moreover, the absorption patterns at 1262 $cm^{-1}$ (stretch of $C_{aliphatic}$—N) 1113 $cm^{-1}$ (stretch of C—O) and 2922 $cm^{-1}$ and 2852 $cm^{-1}$ (stretch of C—H) reveal that the methoxyethyl group bonds to amine nitrogen atoms. In addition, the C/N of the elementary analysis of N-EOM PAn shows that the alkoxyalkylation extent of N-EOM PAn is about 0.49.

The solubility test shows that N-EOM PAn can completely dissolve in $CHCl_3$ (up to about 2.5 g/100 ml) and partly dissolve in THF, DMSO, NMP and $CH_2Cl_2$. After being doped with 1M HCl aqueous solution and casted or coated on a substrate, the conductivity of the film formed from the doped N-EOM PAn is about $1 \times 10^{-2}$ s/cm as measured by the four-probe method.

Figure 4A:
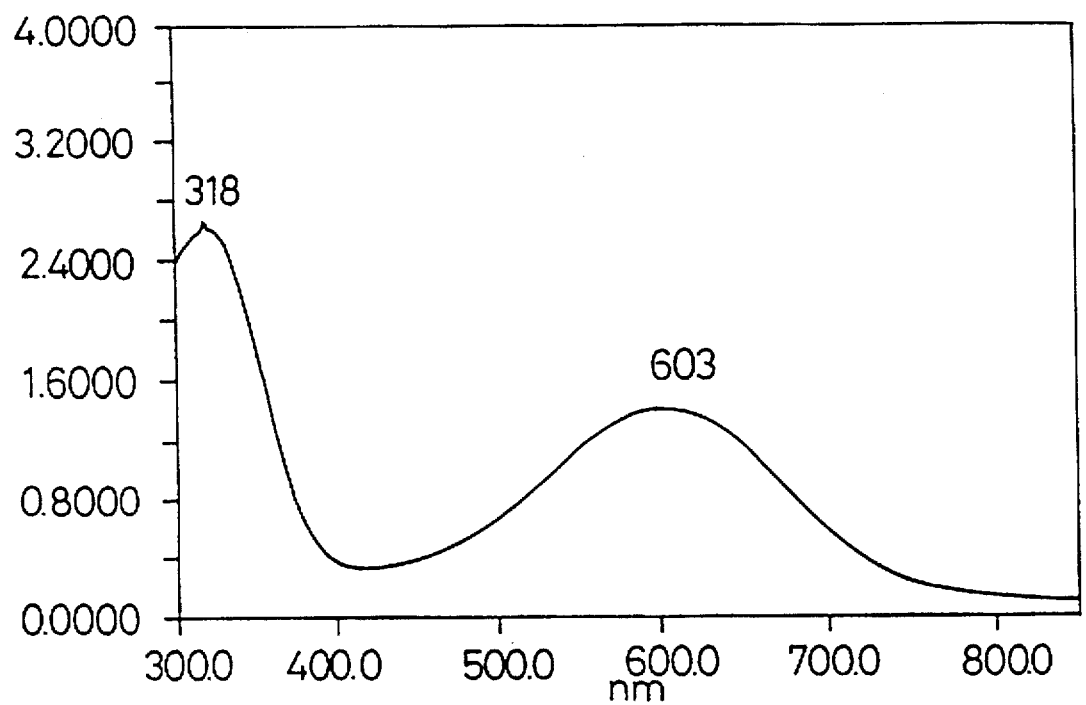
FIGS. 4(a) and 4(b) are the UV-visible spectra of the N-methoxyethylated polyaniline of Example 6 under various conditions.
Figure 4B:
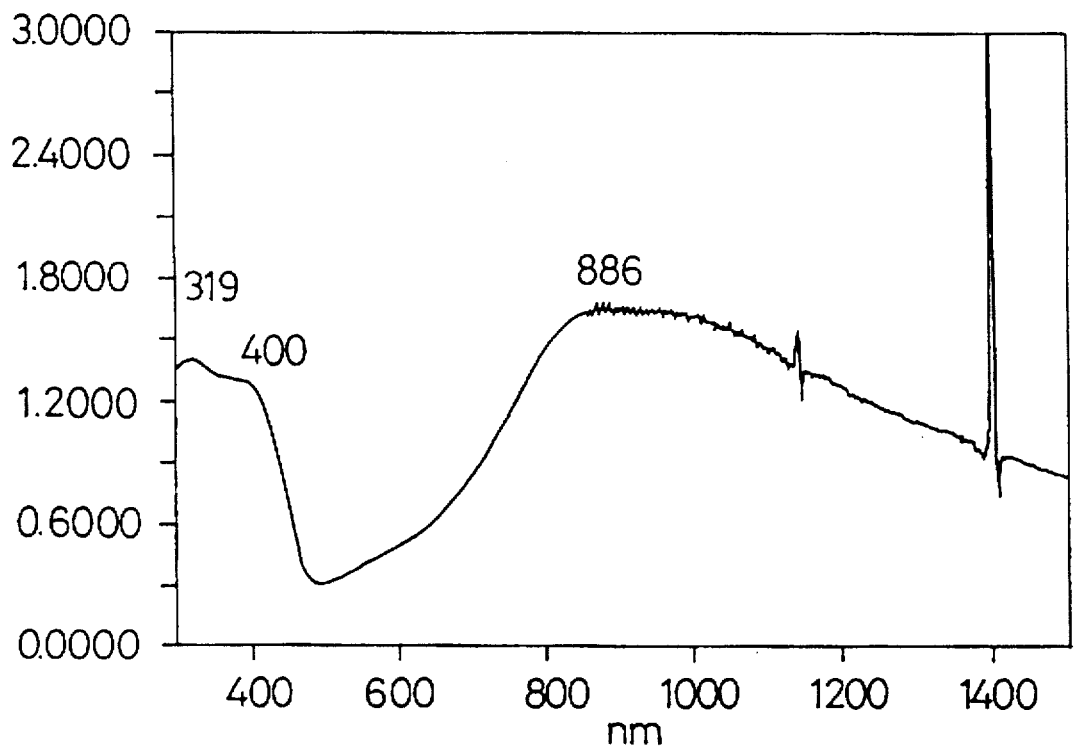

FIGS. 4(a) and 4(b) are the UV-visible spectra of N-EOM PAn in various conditions. The absorption pattern at 318 $cm^{-1}$ corresponds to the π-π* transition of benzenoid rings (J. Am. Chem. Soc., 108 (1986) 8311) and the absorption pattern at 603 $cm^{-1}$ corresponds to the exciton transition of quinoid rings (Phys. Rev. Lett., 59 (1987) 1464). As compared with FIG. 4(a), it is noted that, in FIG. 4(b), the absorption patterns at 420 micrometer and 860 micrometer appear and the absorption pattern at 603 micrometer disappears. The comparison between FIGS. 4(a) and 4(b) shows that N-EOM PAn is doped.

EXAMPLE 7

The N-dodecylated polyaniline of Example 2 was doped with p-dodecylbenzenesulfonic acid. The amount of p-dodecylbenzenesulfonic acid was that the molar ratio of p-dodecylbenzenesulfonic acid to aniline monomers used in the preparation of polyaniline (polyaniline derivatives) was 1:1. A solution of 0.08 g doped N-dodecylated polyaniline in 10 ml $CH_2Cl_2$ was mixed with another solution of 0.25 g polyvinylacetate in 10 ml $CH_2Cl_2$ and the mixture was thoroughly mixed. A film was formed by casting the mixture on a substrate and the conductivity of the film was $2.1 \times 10^{-4}$ s/cm.

EXAMPLE 8

The procedures of Example 7 were repeated with the exception that N-dodecylated polyaniline was replaced by N-hexadecylated polyaniline. The conductivity of the prepared film was $6.8 \times 10^{-6}$ s/cm.

EXAMPLE 9

The procedures of Example 7 were repeated with the exception that p-dodecylbenzenesulfonic acid was replaced by camphor sulfonic acid. The conductivity of the prepared film was $4.7 \times 10^{-5}$ s/cm.

EXAMPLE 10

The procedures of Example 8 were repeated with the exception that p-dodecylbenzenesulfonic acid was replaced by camphor sulfonic acid. The conductivity of the prepared film was $3.8 \times 10^{-6}$ s/cm.

EXAMPLE 11

The N-octylated polyaniline of Example 2 was doped with p-dodecylbenzenesulfonic acid. The amount of p-dodecylbenzenesulfonic acid was that the molar ratio of p-dodecylbenzenesulfonic acid to aniline monomers used in the preparation of polyaniline (polyaniline derivatives) was 1:1. A solution of 0.031 g doped N-octylated polyaniline in 10 ml THF was mixed with another solution of 0.097 g poly(methyl methacrylate) (PMMA) in 10 ml THF and the mixture was thoroughly mixed. A film was formed by casting the mixture on a substrate and the conductivity of the film was $3 \times 10^{-6}$ s/cm.

EXAMPLE 12

The procedures of Example 11 were repeated with the exception that PMMA was replaced by polystyrene (PS). The conductivity of the prepared film was $2.5 \times 10^{-6}$ s/cm.

As shown in the examples, the process of the present invention can provide N-alkylated and N-alkoxyalkylated polyanilines which are more soluble in organic solvents having low boiling point than N-unsubstituted polyaniline and the N-alkylated and N-alkoxyalkylated polyanilines can be doped to provide films with a conductivity to the extent of from $10^{-2}$ to $10^{-6}$ s/cm.

We claim:

1. A process for preparing an N-substituted polyaniline comprising the steps of reacting an alkali hydride and a polyaniline having imine bonds, mixing the reaction mixture with an alkyl or alkoxyalkyl halide to generate a polymer, precipitating the generated polymer, and undoping the polymer.

2. The process according to claim 1, wherein the polyaniline is a polymer having the following repeating unit:

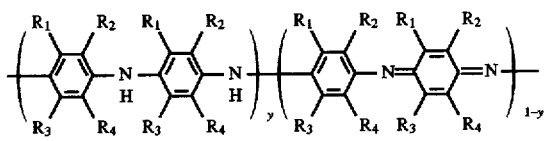

wherein $0<y<1$, $R_1$, $R_2$, $R_3$, $R_4$ can be the same or different and independently are H, $C_{1-4}$alkyl, $QR^7$, halogen, $NO_2$ or CN, wherein Q is —O—, —S—, —CO—, —OC—, —NHC or —CO—, the halogen is F, Cl, Br or I and $R^7$ is $C_{1-8}$alkyl, aryl or alkylaryl.

3. The process according to claim 1, wherein the alkali hydride is lithium hydride, sodium hydride or potassium hydride.

4. The process according to claim 3, wherein the alkali hydride is sodium hydride.

5. The process according to claim 1, wherein the halide is $C_{1-24}$alkyl or $C_{1-10}$alkoxy$C_{1-20}$alkyl halide.

6. The process according to claim 5, wherein the halide is a fluoride, chloride, bromide or an iodide.

7. The process according to claim 1, wherein a protic acid is used to precipitate the generated polymer.

8. The process according to claim 7, wherein the protic acid is selected from the group consisting of HCl, $HClO_4$, $HBF_4$, $H_2SO_4$ and mixtures thereof.

9. The process according to claim 8, wherein the protic acid is HCl.

10. The process according to claim 1, wherein a base is used to undope the polymer.

11. The process according to claim 10, wherein the base selected from the group consisting of potassium hydroxide, sodium hydroxide, lithium hydroxide and the mixtures thereof.

12. The process according to claim 1, wherein the undope step is carried out by exposing the precipitated polymer to ammonium vapor or adding the polymer to an aqueous ammonia solution.

* * * * *